United States Patent

[11] 3,584,737

| [72] | Inventors | Gunter Giesselmann<br>Neu-Isenburg;<br>Wilfried Rothe, Strotzbach Lower<br>Franconia, both of, Germany |
|---|---|---|
| [21] | Appl. No. | 727,370 |
| [22] | Filed | May 7, 1968 |
| [45] | Patented | June 15, 1971 |
| [73] | Assignee | Deutsche Gold-Und Silbia-Scheideanstalt<br>Formals Roessler<br>Frankfurt, Germany |
| [32] | Priority | June 19, 1967 |
| [33] | | Germany |
| [31] | | D53371 |

[54] PROCESS FOR DRYING ORGANIC SOLVENTS BY SODIUM MONOXIDE TREATMENT AND DISTILLATION
6 Claims, 1 Drawing Fig.

[52] U.S. Cl. ................................................. 203/14,
203/17, 203/18, 203/36, 203/99, 252/194,
260/290, 260/340.6, 260/346.1, 260/465.1,
260/561

[51] Int. Cl. ................................................ C07b 5/00
[50] Field of Search ................................ 203/36, 14;
252/194; 260/290, 643, 340.6, 346.1, 561, 465.1

[56] References Cited
UNITED STATES PATENTS

| re.15,783 | 3/1924 | Hammond | 203/14 |
|---|---|---|---|
| 1,847,968 | 3/1932 | Luhrs | 203/36 |
| 2,121,954 | 6/1938 | Cunningham | 203/18 |
| 2,885,746 | 5/1959 | Gura | 252/194 |
| 2,957,828 | 10/1960 | Mansfield | 252/194 |
| 2,967,154 | 1/1961 | Beerman | 252/194 |
| 3,129,147 | 4/1964 | Codignola | 203/17 |
| 3,219,550 | 11/1965 | Harvitz | 203/14 |

Primary Examiner—Wilbur L. Bascomb, Jr.
Attorney—Stephens, Huettig and O'Connell ABSTRACT: Water containing organic solvents are dried by contact with sodium monoxide ($Na_2O$).

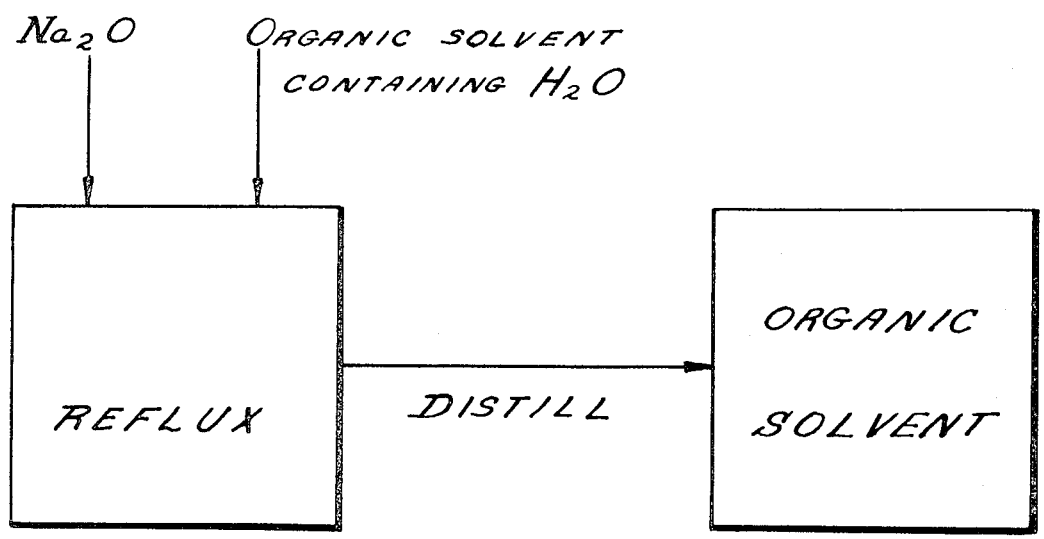

PROCESS FOR DRYING ORGANIC SOLVENTS BY SODIUM MONOXIDE TREATMENT AND DISTILLATION

BACKGROUND OF THE INVENTION

Organic solvents normally are dried by vacuum drying in the presence of dehydrating agents or by direct treatment with dehydrating agents or by azeotropic distillation with the aid of an entraining agent. Which of such processes is used depends upon the type of solvent concerned. Also, the degree of dehydration attained is different in the individual processes. For extremely high degrees of dryness, additional relatively costly procedures, such as, for example, drying with metallic sodium, lithium aluminum hydride or Grignard compounds, are required. Aside from the fact that such drying procedures as such are too costly and often cannot be carried out on a large commercial scale because of the danger involved in handling the drying materials. In the case of some of these systems, there also is the danger that they may react with the solvent to be dried.

DESCRIPTION OF THE INVENTION INCLUDING PREFERRED EMBODIMENTS

According to the invention it was found that organic solvents of any water content can be predried or fine-dried on a commercial scale with the aid of sodium monoxide which, if desired, can be applied to a carrier. The term "predrying" is used to signify drying to a water content of 0.1 to 1 wt. percent and the term "fine-drying" is used herein to signify drying to a water content of 0.001 to 0.1 wt. percent with reference to the solvent concerned. It is expedient to use sodium monoxide by itself for predrying and to use it in admixture with carriers for fine-drying.

It was found that carriers composed of a mixture of nonactive carbon, preferably, graphite and alkaline earth metal oxides, including magnesium oxide, are particularly suited for the latter purpose. Calcium oxide is preferably suited for the latter purpose. Calcium oxide is preferably used as the alkaline earth metal oxide component. The weight ratio of the oxide component to the carbon component in such mixed carriers should be about 5:1 to 1:5 and, preferably, is about 1.5:1. In general, the sodium monoxide is mixed with the carrier in a weight ratio of about 1:1. Naturally, however, other mixing ratios may also be effectively employed. The proportion of the carrier employed, however, should not be so low that sintering of the dehydrating composition (sodium monoxide plus carrier) occurs during use. The upper limit for the proportion of the carrier is provided by the water takeup capacity of the dehydrating composition. Expediently the ratio of sodium monoxide to carrier is between 9:1 and 1:9. Preferably, the intimate mixture of sodium monoxide and the mixed carrier is used in the form of shaped bodies, such as spheres, cylinders, tablets and the like produced by compression molding or extrusion or, preferably, granulated products produced therefrom of an average grain size of about 2 to 10 mm.

Depending upon the sensitivity of the solvent to be dried to higher temperatures, the drying can be effected at temperatures from room temperature to considerably higher temperatures with the solvent in liquid or vapor phase. Predrying is expediently effected with the solvent in liquid phase and therefore at temperatures up to its boiling point. In general, the sodium monoxide is introduced into the liquid solvent to be dried and the ensuing heat of reaction utilized without supply of further heat from an external source or if the reaction is too strong removing the heat of reaction. The solvent is then distilled off from the remaining drying composition and the sodium hydroxide which is formed. Other methods of contact between the solvent being dried and the drying composition may also be used, for instance, by passage of the solvent in liquid or vapor form over the drying composition. For fine-drying, the solvent is preferably passed in vapor phase over the drying composition, if necessary in the presence of nitrogen at temperatures between 100° to 400° C. and, preferably, at about 150° C.

Examples of organic solvents which, for instance, can be dried according to the invention are nonacidic solvents, such as, alcohols, ethers, amines, amides, nitriles of aliphatic, cycloaliphatic, aromatic or heterocyclic nature. Dioxane, tetrahydrofurane, pyridine, dimethyl formamide, isopropanol and acetonitrile have proved especially adapted to be dried by the process of the invention.

The technical advantage of using sodium monoxide as a dehydrating agent for organic solvents is that large quantities, therefore, commercial quantities, of solvents can be dried at low cost. Previously commercial scale drying was primarily effected by distillation or azeotropic distillation. Such distillation methods, however, only have limited applicability and are not suited for all commercially interesting organic solvents. The remaining dehydrating methods are primarily laboratory methods. A further advantage of the process is that the sodium hydroxide formed during the dehydration is water soluble, it can easily be removed from the apparatus employed.

The single FIGURE of the drawing is schematic in nature and shows introduction of sodium monoxide and water containing organic solvent into a vessel, refluxing of the solvent, distillation of the solvent and recovery of the organic solvent freed from the water.

The following examples will serve to illustrate the invention.

EXAMPLE 1

52 g. (0.84 mol) of sodium monoxide were added to 950 g. of pyridine with a water content of 1.44 wt. percent (0.76 mol) and the mixture heated for 1 ½ hours under reflux and the pyridine then distilled off from the sodium hydroxide which formed. The yield was 916 g. with a 0.15 wt. percent water content.

EXAMPLE 2

16 g. (0.26 mol) of sodium monoxide were added to 1000 g. of acetonitrile with a water content of 0.36 wt. percent (0.2 mol) at room temperature and the mixture heated under reflux for 2 hours, and the acetonitrile then distilled off from the sodium hydroxide which formed. The yield was 974 g. with a 0.10 wt. percent water content.

EXAMPLE 3

43.5 g. (0.7 mol) of sodium monoxide were added to 1000 g. of dioxane with a water content of 0.98 wt. percent (0.545 mol) at room temperature and the mixture heated under reflux for 2 hours and the dioxane then distilled off from the sodium hydroxide which formed. The yield was 978 g. with a water content of 0.17 wt. percent.

EXAMPLE 4

172 g. (2.78 mol) of sodium monoxide were added to 1300 g. of tetrahydrofurane with a water content of 3.30 wt. percent (2.38 mol) at room temperature and the mixture boiled under reflux for 2 hours. The tetrahydrofurane was then distilled off from the sodium hydroxide which formed. The yield was 1235 g. with a 0.12 wt. percent water content.

EXAMPLE 5

217 g. (3.5 mol) of sodium monoxide were added to 3500 g. of isopropanol with a water content of 3.3 wt. percent (6.42 mol) at room temperature and the mixture heated for 1 hour under reflux and the isopropanol then distilled off. The yield was 2880 g. with a water content of 0.96 wt. percent.

EXAMPLE 6

1000 g. of dioxane with a water content of 0.1 wt. percent (0.55 mol) were vaporized and the vapors passed at 100° C. over 25 g. of a drying composition in the form of granulated compacts formed of an intimate finely divided mixture of 50 wt. percent of $Na_2O$, 30 wt. percent of $CaO$ and 20 wt. percent of graphite and then recondensed. The apparatus was protected against atmospheric moisture with drying tubes. The yield was 980 g. with a water content of 0.005 wt. percent.

EXAMPLE 7

1000 g. of anisole with a water content of 0.2 wt. percent (1.10 mol) were vaporized and passed at 150°C. over 25 grams of a drying composition as in Example 6 and condensed. The yield was 975 g. with a water content of 0.01 percent.

EXAMPLE 8

1000 g. of tetrahydrofurane with a water content of 0.1 wt. percent (0.55 mol) were vaporized and passed at 150° C. over 25 grams of a drying composition as in Example 6 and condensed. The yield was 985 g. with a water content of 0.01 wt. percent.

EXAMPLE 9

1000 g. of dimethyl formamide were vaporized under a reduced pressure of 20 torr and passed at 110 C. over 25 g. of a drying composition as in Example 6 and condensed. The yield was 970 g. with a water content of 0.02 wt. percent.

We claim:

1. A method of drying water-containing nonacidic organic solvents on a commercial scale comprising contacting said organic solvent in liquid form, the solvent being selected from the group consisting of alcohols, ethers, amines, amides and nitriles with a drying composition comprising sodium monoxide, refluxing the liquid solvent in the presence of the sodium monoxide and thereafter distilling off the solvent from any remaining drying composition and the sodium hydroxide formed by reaction of the sodium monoxide with the water present in the liquid solvent.

2. A method of drying water containing nonacidic organic solvents on a commercial scale comprising contacting said organic solvent in liquid form, the solvent being selected from the group consisting of alcohols, ethers, amines, amides and nitriles with a drying composition essentially composed of sodium monoxide and a mixture of inactive carbon and an alkaline earth metal oxide as a carrier therefor and then distilling off the solvent from any remaining drying composition and the sodium hydroxide formed by reaction of the sodium monoxide with the water present in the liquid solvent.

3. The method of claim 2 in which the weight ratio of the carbon and alkaline earth metal oxide in the carrier is between 5:1 and 1:5.

4. The method of claim 3 in which the carrier is composed of graphite and calcium oxide.

5. A process according to claim 3 wherein the weight ratio of sodium monoxide to carrier is between 9:1 and 1:9 and the solvent in vapor form is passed over the drying composition at a temperature between 100° and 400° C.

6. A process according to claim 2 wherein the solvent after distillation is fine dried by passing it in vapor form through a drying composition essentially composed of the sodium monoxide and a mixture of inactive carbon and an alkaline earth metal oxide as a carrier therefor.